United States Patent
Suhara et al.

[11] Patent Number: 6,104,600
[45] Date of Patent: Aug. 15, 2000

[54] ELECTRIC DOUBLE LAYER CAPACITOR

[75] Inventors: Manabu Suhara; Kazuya Hiratsuka; Katsuji Ikeda; Takeshi Kawasato, all of Yokohama, Japan

[73] Assignee: Asahi Glass Company Ltd., Tokyo, Japan

[21] Appl. No.: 09/241,287

[22] Filed: Feb. 1, 1999

[30] Foreign Application Priority Data

Feb. 2, 1998 [JP] Japan .................................. 10-021209

[51] Int. Cl.⁷ ...................................................... H01G 9/02
[52] U.S. Cl. ......................... 361/502; 361/503; 361/504; 361/512
[58] Field of Search ..................................... 361/502, 503, 361/524, 500, 504, 511, 512, 530, 523; 429/129, 7, 122, 218; 29/570

[56] References Cited

U.S. PATENT DOCUMENTS

| | | | |
|---|---|---|---|
| 3,617,438 | 11/1971 | Nakao et al. ............................. | 162/138 |
| 4,327,400 | 4/1982 | Muranaka et al. ...................... | 361/433 |
| 4,876,451 | 10/1989 | Ikeda et al. .............................. | 361/540 |
| 5,157,586 | 10/1992 | Lallemand ............................... | 361/324 |
| 5,194,490 | 3/1993 | Suga et al. ............................... | 527/755 |
| 5,888,673 | 3/1999 | Kawasata et al. ....................... | 429/329 |

FOREIGN PATENT DOCUMENTS 0 731 477   9/1996   European Pat. Off. .

OTHER PUBLICATIONS

U.S. application No. 09/184,337 filed Nov. 2, 1998, pending.

*Primary Examiner*—Kristine Kincaid
*Assistant Examiner*—Anthony Dinkins
*Attorney, Agent, or Firm*—Oblon, Spivak, McClelland, Maier & Neustadt, P.C.

[57] ABSTRACT

An electric double layer capacitor having a non-aqueous electrolyte impregnated to a capacitor element having a separator placed between a positive electrode and a negative electrode, each being a carbonaceous electrode, wherein the separator includes a plurality of sheets, and at least one of the plurality of sheets is a cellulose paper having a thickness of from 20 to 60 $\mu$m and a density of from 0.30 to 0.55 g/cm³.

13 Claims, No Drawings

ELECTRIC DOUBLE LAYER CAPACITOR

The present invention relates to a non-aqueous type electric double layer capacitor which provides a high output and a high energy density and which is excellent in the voltage-holding property.

Heretofore, as a separator disposed between a positive electrode and a negative electrode of an electric double layer capacitor, a polyethylene non-woven fabric, a polypropylene non-woven fabric, a polyester non-woven fabric, craft paper, a rayon fiber/sisal fiber mixed sheet, a Manila hemp sheet or a glass fiber sheet is, for example, known (JP-A-9-45586, JP-A-1-304719, etc.). The role of the separator is to provide electrical insulation between the positive electrode and the negative electrode and to facilitate movement of ions in the electrolyte which takes place during charging and discharging.

In recent years, an attention has been drawn to an electric double layer capacitor for large current charging and discharging. However, a separator such as a polyethylene non-woven fabric is poor in the electrolyte-absorbing and holding properties, whereby the ion conductivity is low, and the internal resistance of the electric double layer capacitor tends to be high. Accordingly, if instantaneous large current discharge was carried out by such an electric double layer capacitor, the voltage drop was too large to be practical.

A conventional separator made of paper is excellent in heat resistance and tensile strength, and it may sometimes be effective for an electric double layer capacitor to be used as a power source whereby no large current discharge is carried out, like a hybrid power source with a solar cell. However, if a conventional paper separator is used for an electric double layer capacitor for large current charging and discharging wherein the electrolyte is a non-aqueous type, the ion mobility tends to be inadequate.

For an electric double layer capacitor for large current charging and discharging, it is desired to reduce the resistance and to increase the capacitance per unit volume (hereinafter referred to as the capacitance density), and accordingly, it is required to make the separator as thin as possible. At the same time, from the viewpoint of the electrolyte-absorbing and holding properties, the separator is required to have a high porosity. However, if a separator made of paper having a high porosity, is made thin, the insulation between the positive electrode and the negative electrode tends to be inadequate, thus leading to microshort-circuiting, whereby self-discharge tends to be likely, or the reliability of the capacitor performance tends to be low.

Under these circumstances, it is an object of the present invention to realize reduction of the resistance and increase of the capacitance of an electric double layer capacitor by using a separator which is excellent in heat resistance and ion mobility and which has a high strength and is capable of providing adequate insulation between the electrodes, even if it is thin.

The present invention provides an electric double layer capacitor having a non-aqueous electrolyte impregnated to an element having a separator disposed between a positive electrode and a negative electrode, each being a carbonaceous electrode, wherein the separator comprises a plurality of sheets, and at least one of the plurality of sheets is a cellulose paper having a thickness of from 20 to 60 $\mu$m and a density of from 0.30 to 0.55 g/cm$^3$.

Now, the present invention will be described in detail with reference to the preferred embodiments.

The separator in the present invention comprises a plurality of sheets. At least one of the plurality of sheets is a cellulose paper having a thickness of from 20 to 60 $\mu$m and a density of from 0.30 to 0.55 g/cm$^3$. If the thickness is less than 20 $\mu$m, the strength tends to be weak, whereby the handling tends to be difficult. If the thickness exceeds 60 $\mu$m, the capacitance density of the electric double layer capacitance can not be made adequately high, when a plurality of sheets are overlaid one on another, or other sheets of e.g. paper are overlaid thereon, to form a separator. The separator may be made by overlaying a plurality of cellulose paper sheets having different thicknesses. However, when it is made by overlaying a plurality of cellulose paper sheets having the same thickness, the thickness of each cellulose paper sheet is preferably from 30 to 50 $\mu$m.

Further, a cellulose paper having a density of from 0.30 to 0.55 g/cm$^3$ has a high porosity and thus is excellent in the electrolyte absorbing and holding properties. If the density is less than 0.30 g/cm$^3$, the strength of the cellulose paper tends to be low, whereby the handling tends to be difficult. If the density exceeds 0.55 g/cm$^3$, the electrolyte-absorbing and holding properties tend to be inadequate, whereby the ion mobility tends to be inadequate. It is preferred to employ a density within a range of from 0.35 to 0.50 g/cm$^3$.

The porosity of the above-mentioned cellulose paper is readily determined by the starting material and the density. The porosity of the cellulose paper is preferably from 60 to 90%, more preferably from 65 to 85%.

With a low density cellulose paper having an adequate porosity to absorb and hold the electrolyte, if the thickness is, for example, not more than 100 $\mu$m, it tends to have pinholes, although the capacitance density of the electric double layer capacitor can be made high. Accordingly, if only one sheet of cellulose paper having a thickness of not more than 100 $\mu$m is used as a separator for an electric double layer capacitor, short-circuiting is likely to result due to the pinholes, whereby self-discharge is likely to take place.

On the other hand, in the present invention, when a plurality of cellulose paper sheets are overlaid one on another, a spacing will be formed between the adjacent cellulose paper sheets. The electrolyte will be held also in this spacing. Accordingly, even with a separator made of the same material and having the same density and the same thickness, one composed of two cellulose paper sheets is superior in the electrolyte holding property to one composed of one cellulose paper sheet. Otherwise, in order to obtain a cellulose paper separator with the same material and thickness and having the same level of the electrolyte holding property, a cellulose paper having a higher density can be used when it is made of two sheets than when it is made of only one sheet.

If the density is high, the probability for one cellulose paper sheet to have pinholes will be low even if the thickness is thin. Even if one cellulose paper sheet has pinholes, if a plurality of sheets are overlaid one on another to form a separator, the probability for the separator to have pinholes will be very low. Accordingly, self discharge can be avoided, and the reliability of performance of the electric double layer capacitor can be increased. Namely, even with the same thickness, a separator made of a plurality of cellulose paper sheets will have a lower probability for pinholes and will be less likely to undergo self discharge as compared with a separator made of one cellulose paper sheet.

In the present invention, it is preferred that the separator comprises two or three sheets. If the number of sheets is too much, the separator tends to be thick, whereby the capacitance density of the electric double layer capacitor tends to be low. Further, the thickness of the separator having a plurality of sheets overlaid one on another is preferably from 40 to 120 μm. If the thickness is less than 40 μm, it tends to be difficult to sufficiently prevent short-circuiting between the electrodes, and if it exceeds 120 μm, the capacitance density of the electric double layer capacitor tends to be small. More preferably, the thickness is within a range of from 50 to 100 μm.

Other than the cellulose paper having a thickness of from 20 to 60 μm and a density of from 0.30 to 0.55 g/cm$^3$, the plurality of sheets constituting the separator may be cellulose paper sheets or sheets made of a material other than cellulose fibers. The sheets made of other materials may, for example, be a polyethylene non-woven fabric, a polypropylene non-woven fabric, a polyester non-wove fabric, craft paper, a Manila hemp sheet and a glass fiber sheet.

If all of the plurality of sheets are made of cellulose paper, all of the cellulose paper sheets constituting the separator may have the same properties, but they may be a combination of cellulose paper sheets having different properties. In such a case, all of the plurality of cellulose paper sheets may have the characteristics that the thickness is from 20 to 60 μm and the density is from 0.30 to 0.55 g/cm$^3$ (a cellulose paper having such properties will be referred to as the cellulose paper A), but they may be a combination with cellulose paper sheets having characteristics outside these ranges. It is particularly preferred to combine the cellulose paper A with a cellulose paper having a thickness of from 10 to 35 μm and a density of from 0.56 to 0.70 g/cm$^3$ (hereinafter referred to as the cellulose paper B). In this case, the cellulose paper A has a low density and a high porosity and thus plays a role of holding the electrolyte. On the other hand, the cellulose paper B has a high density and thus plays a role of providing insulation between the electrodes to prevent short-circuiting.

If the thickness of the cellulose paper B is less than 10 μm, the strength tends to be inadequate, whereby he handling tends to be difficult, such being undesirable. On the other hand, if the thickness exceeds 35 μm, it tends to be difficult to adequately hold the electrolyte as it is of high density, whereby the resistance of the separator tends to increase, and the resistance of the electric double layer capacitor tends to increase accordingly, such being undesirable. If the density of the cellulose paper B is less than 0.56 g/cm$^3$, no adequate insulation between the electrodes tends to be secured, and if it exceeds 0.70 g/cm$^3$, it tends to be difficult to hold the electrolyte, whereby the resistance of the electric double layer capacitor tends to increase, such being undesirable. More preferably, the cellulose paper B has a thickness of from 10 to 30 μm. Likewise, more preferably, the density is from 0.58 to 0.65 g/cm$^3$.

It is preferred that the cellulose paper A and the cellulose paper B are used one sheet each to form a separator comprising two sheets overlaid one on the other. Otherwise, if one sheet of the cellulose paper B is sandwiched between two sheets of the cellulose paper A to form a separator comprising three sheets overlaid one on another, the electrolyte holding property can be increased, although the thickness of the separator increases, thus leading to a disadvantage from the viewpoint of the capacitance density of the electric double layer capacitor.

As a more preferred combination of the cellulose paper A and the cellulose paper B, a combination may be mentioned wherein the cellulose paper A has a thickness of from 35 to 50 μm and a density of from 0.30 to 0.45 g/cm$^3$, and the cellulose paper B has a thickness of from 10 to 35 μm and a density of from 0.58 to 0.65 g/cm$^3$.

In the present invention, the cellulose paper constituting the separator is not particularly limited, and it may be a sheeted paper made of rayon fibers or a mixed sheeted paper made of cellulose and glass fibers. The cellulose paper A is particularly preferably a paper sheeted to contain at least 50 wt % of fibers obtained by beating regenerated cellulose fibers. Here, the regenerated cellulose fibers to be used as the starting material, are regenerated cellulose fibers which can be beaten by a beating machine installed in a conventional paper sheeting process, such as regenerated cellulose fibers having a high polymerization degree or solvent-spun rayon.

The beatable regenerated cellulose fibers can be uniformly fibrillated by beating treatment, whereby the flexibility increases. Accordingly, a paper sheeted to contain at least 50 wt % of such fibers, is excellent in tensile strength. Further, the fibrillated fibers obtained by beating treatment are extremely dense, and the cross-sections of fibrils are substantially spherical. Accordingly, when a paper sheeted to contain at least 50 wt % of such fibers, is used for a separator, the separator will be excellent in ion permeability and will have a low resistance. The fibers obtained by beating regenerated cellulose fibers are preferably at least 65 wt %, more preferably at least 80 wt %. The degree of beating is preferably such that beating is carried out until the Canada standard filtration degree (hereinafter referred to as a CSF value) stipulated in JIS P8121 will be from 0 to 600 ml.

Other materials to be blended to the beaten regenerated cellulose fibers, are not particularly limited, and fibers of e.g. Manila hemp, sisal or craft pulp may be employed. Further, such materials are preferably used after beating depending upon the degree of beating of the regenerated cellulose fibers.

The separator in the present invention can be obtained, for example, as follows. Firstly, beatable regenerated cellulose fibers cut into a length of a few mm are beaten by a beating machine to a suitable extent. On the other hand, fibers to be used as blending materials, are also likewise beaten to a suitable extent and then mixed with the regenerated cellulose fibers so that the regenerated cellulose fibers will be contained in an amount of at least 50 wt %, followed by sheeting to obtain a paper having a predetermined thickness. A plurality of papers thus obtained are overlaid one on another, or a paper thus obtained may be laminated with a sheet of cellulose paper obtained by another method, to obtain a separator which will be used as disposed or placed between a positive electrode and a negative electrode.

A cellulose paper usually contains from 3 to 10 wt % of moisture. In the case of an electric double layer capacitor having a non-aqueous electrolyte, it is preferred to remove such moisture in order to reduce the leakage current and to secure a high withstand voltage. When a cellulose paper is used for a separator, the moisture contained in the cellulose paper is preferably at most 1 wt %.

In order to efficiently remove the moisture, it is preferred to heat the separator at a temperature of from 90 to 250° C. before disposing it between a positive electrode and a negative electrode. In order to obtain an electric double layer capacitor having a particularly large capacitance, it is preferred to have an element having a structure in which an electrode (a positive electrode or a negative electrode) and a separator are laminated intimately to each other. But, it is difficult to remove the moisture efficiently after an element is formed by the electrode and the separator.

If the temperature for heat treatment is lower than 90° C., removal of the moisture from the cellulose paper tends to be inadequate, and the effect of e.g. reducing the leakage current tends to be low. If it exceeds 250° C., the cellulose paper itself is likely to undergo heat decomposition, whereby the strength tends to be low, and water may be generated. More preferably, the temperature for heat treatment is from 120 to 230° C. The time for heat treatment may suitably be selected from the relation with the temperature for heat treatment, but it is usually at least 3 seconds.

The method for heat treatment may suitably be selected from methods such as contacting with a heated heater, irradiation with ultraviolet rays or leaving in an atmosphere of heated air. A cellulose paper is available usually in a rolled state, but in such a rolled state, it is difficult to effectively remove the moisture by heating in a short period of time. It is preferred to heat it in a state not laminated, so that removal of the moisture can effectively be carried out. Specifically, a rolled cellulose paper may be rewound under heating in a dry atmosphere to obtain a dehydrated cellulose paper roll, or a plurality of cellulose paper sheets are preliminarily cut out from the cellulose sheet roll, and heated to remove water in such a state that the cellulose paper sheets are not intimately put together, e.g. by having a heat-resistant spacer interposed therebetween.

The plurality of sheets constituting a separator are preferably laminated prior to being disposed between the positive electrode and the negative electrode. When all of the plurality sheets are cellulose paper sheets, they may be laminated at the time of the above-mentioned heat treatment. When a plurality of cellulose paper sheets are to be rewound into a roll, a plurality of cellulose paper sheets withdrawn from a plurality of rolls may be laminated and heat treated and then rolled in the laminated state.

The electric double layer capacitor of the present invention has a positive electrode and a negative electrode, each being a carbonaceous electrode containing a carbon material as the main component, and is based on a principle that an electrical charge is stored in an electric double layer formed at the interface between the electrodes and the electrolyte. In order to increase the capacitance of an electric double layer capacitor, the specific surface area of the carbon material should preferably be large, and the carbonaceous electrode preferably comprises a carbon material having a specific surface area of from 700 to 2,500 $m^2/g$ and an organic binder.

The carbon material may, for example, be activated carbon, carbon black or polyacene. To the carbonaceous electrode, a conductive material may be added, as the case requires, in order to increase the electrical conductivity. After an addition of the organic binder, the carbon material is formed into a sheet, which is then bonded to a metal current collector to form an electrode assembly having the carbonaceous electrode and the current collector integrated. Otherwise, the carbonaceous electrode may directly be formed on a metal current collector, for example, by coating a liquid comprising the carbonaceous material and an organic binder.

The above-mentioned organic binder contained in the carbonaceous electrode may, preferably, be a polyvinylidene fluoride, a polytetrafluoroethylene, a polyimide resin or a polyamideimide resin. As the metal current collector, a foil or net of e.g. aluminum or stainless steel, may be employed. Aluminum is particularly preferred, since it is light in weight and has a low resistance.

As the electrolyte to be used for an electric double layer capacitor, an aqueous type electrolyte and a non-aqueous type electrolyte are available. However, the withstand voltage is about 0.8 V with the aqueous type, and about 2.5 V with the non-aqueous type. The electrostatic energy of the electric double layer capacitor is proportional to the square of the withstand voltage. Accordingly, it is preferred to use a non-aqueous electrolyte from the viewpoint of the energy density, as the energy density can be increased by about 9 times by using a non-aqueous electrolyte.

As the solute of the non-aqueous electrolyte for an electric double layer capacitor of the present invention, it is preferred to use at least one of salts comprising a quaternary onium cation of the formula $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion of the formula $BF_4^-$, $PF_6^-$, $CF_3SO_3^-$, $AsF_6^-$, $N(SO_2CF_3)_2^-$ or $ClO_4^-$.

The organic solvent to be used for the non-aqueous electrolyte, is preferably a cyclic carbonate such as ethylene carbonate, propylene carbonate or butylene carbonate, a linear carbonate such as dimethyl carbonate, ethylmethyl carbonate or diethyl carbonate, acetonitrile, sulfolane, or a sulfolane derivative. It is particularly preferably at least one member selected from the group consisting of propylene carbonate, ethylene carbonate, dimethyl carbonate, diethyl carbonate, methylethyl carbonate, acetonitrile, sulfolane and methylsulfolane.

With respect to the shape of the electric double layer capacitor of the present invention, a cylindrical type prepared by winding a pair of elongated electrodes with an elongated separator interposed therebetween to form an element, impregnating the non-aqueous electrolyte to the element and accommodating the element in a bottomed cylindrical casing, and an angular type prepared by alternately laminating a plurality of rectangular electrodes as positive electrodes and negative electrodes with separators interposed therebetween to form an element, impregnating the non-aqueous electrolyte to the element and accommodating the element in a bottomed angular casing, are preferred, since a large capacitance can thereby be obtained.

Now, the present invention will be described in further detail with reference to Examples. However, it should be understood that the present invention is by no means restricted to such specific Examples.

EXAMPLE 1

Solvent-spun rayon was beaten until the CSF value became 20 ml, and this rayon was used to sheet a paper having a thickness of 40 µm and a density of 0.40 g/cm$^3$. The breaking strength was 0.70 kg/cm width. This paper contained 7 wt % of moisture. This paper was cut into 5 cm×7 cm, and two such sheets were preliminarily dried in air at 150° C. for 1 hour to remove water to bring the moisture content to not higher than 1 wt % and used as a separator.

An electrode (electrode area: 24 cm$^2$, electrode thickness: 0.15 mm) obtained by forming into a sheet shape a composition comprising 80 wt % of activated carbon having a specific surface area of 1,500 m$^2$/g, 10 wt % of carbon black and 10 wt % of polytetrafluoroethylene, was bonded via a conductive adhesive to one side of a rectangular aluminum foil having a width of 4 cm, a height of 6 cm and a thickness of 50 µm and having a lead terminal, followed by heating to thermally cure the adhesive and further by drying at 200° C., to obtain an electrode assembly.

In a glove compartment with a dew point of 50° C., two such electrode assemblies were overlaid to one on the other with the above-mentioned dehydrated separator interposed, so that the electrode sides faced each other. This laminate was sandwiched between a pair of glass plates having a thickness of 2 mm, a width of 5 cm and a height of 7 cm, to form a capacitor element. The total thickness of the electrode assemblies and the separator was 0.48 mm. Then, this element was heated in vacuum at 200° C. for 3 hours to further remove impurities and moisture in the electrodes.

As an electrolyte, a solution having 1.5 mol/l of triethyl-monomethylammonium tetrafluoroborate dissolved in propylene carbonate, was employed. This electrolyte was vacuum-impregnated to the above element, and the element was accommodated and sealed in a stainless steel container to obtain an electric double layer capacitor. The direct current resistance and the capacitance were obtained at a current density of 20 mA/cm$^2$. The cell was charged with a voltage of 2.5 V for 100 hours and then left in an open circuit. 100 Hours later, the cell voltage was measured and taken as a holding voltage. The results are shown in Table 1.

Further, after applying a voltage of 2.5 V at 60° C. for 1,000 hours, the capacitance and the resistance were measured and found to be 11.9 F and 0.26Ω, respectively.

EXAMPLE 2

70 wt % of fibers obtained by beating solvent-spun rayon until the CSF value became 100 ml and 30 wt % of fibers obtained by beating Manila hemp were mixed and sheeted to obtain a paper having a thickness of 50 μm and a density of 0.35 g/cm$^3$. The breaking strength of this cellulose paper was 0.96 kg/cm width. A capacitor element was assembled in the same manner as in Example 1 except that two sheets of this paper were overlaid one on the other to obtain a separator, which was preliminarily dried at 200° C. for 1 hour to bring the moisture content to not more than 1 wt %.

An electric double layer capacitor cell was prepared in the same manner as in Example 1 except that the above element was used, and the initial resistance, the initial capacitance and the holding voltage were measured in the same manner as in Example 1. The results are shown in Table 1.

EXAMPLE 3

Solvent-spun rayon was beaten until the CSF value became 30 ml, and this rayon was sheeted to obtain a paper having a thickness of 20 μm and a density of 0.63 g/cm$^3$. The breaking strength of the paper was 1.40 kg/cm width. A capacitor element was assembled in the same manner as in Example 1 except that one sheet of this paper and one sheet of the paper obtained in Example 1 were overlaid one on the other to obtain a separator.

An electric double layer capacitor cell was prepared in the same manner as in Example 1 except that the above element was used, and the initial resistance, the initial capacitance and the holding voltage were measured in the same manner as in Example 1. The results are shown in Table 1.

EXAMPLE 4

An electric double layer capacitor element was assembled in the same manner as in Example 1 except that no preliminary drying of the cellulose paper was carried out.

An electric double layer capacitor cell was prepared in the same manner as in Example 1 except that the above element was used, and the initial resistance, the initial capacitance and the holding voltage were measured in the same manner as in Example 1. The results are shown in Table 1.

EXAMPLE 5 (Comparative Example)

Solvent-spun rayon was beaten until the CSF value became 20 ml, and this rayon was sheeted to obtain a paper having a thickness of 80 μm and a density of 0.40 g/cm$^3$. The breaking strength was 1.30 kg/cm width. A capacitor element was assembled in the same manner as in Example 1 except that a separator was constituted by one sheet of this paper only.

An electric double layer capacitor cell was prepared in the same manner as in Example 1 except that the above element was used, and the initial resistance, the initial capacitance and the holding voltage were measured in the same manner as in Example 1. The results are shown in Table 1.

EXAMPLE 6 (Comparative Example)

Solvent-spun rayon was beaten until the CSF value became 20 ml, and this rayon was sheeted to obtain a paper having a thickness of 40 μm and a density of 0.68 g/cm$^3$. The breaking strength was 1.20 kg/cm width. A capacitor element was assembled in the same manner as in Example 1 except that two sheets of this paper were used as the separator.

An electric double layer capacitor cell was prepared in the same manner as in Example 1 except that the above element was used, and the initial resistance, the initial capacitance and the holding voltage were measured in the same manner as in Example 1. The results are shown in Table 1.

TABLE 1

| | Initial | | |
| --- | --- | --- | --- |
| | Resistance (Ω) | Capacitance (F) | Holding voltage (V) |
| Example 1 | 0.22 | 13.2 | 2.30 |
| Example 2 | 0.28 | 13.0 | 2.40 |
| Example 3 | 0.30 | 13.1 | 2.43 |
| Example 4 | 0.22 | 13.2 | 1.65 |
| Example 5 | 0.26 | 13.2 | 0.89 |
| Example 6 | 0.45 | 11.2 | 2.21 |

According to the present invention, it is possible to obtain an electric double layer capacitor which has a low internal resistance and is excellent in the voltage holding property with little self discharge and which has a high capacitance density. Further, the separator in the present invention has adequate strength for winding, and a jelly-rolled type electric double layer capacitor can easily be prepared. The electric double layer capacitor by the present invention is particularly suitable as a jelly-rolled type or laminated type electric double layer capacitor for a large capacitance or a large current with a discharge capacitance of from 50 to 20,000 F or a discharge current of from 1 to 1,000 A.

What is claimed is:

1. An electric double layer capacitor having a non-aqueous electrolyte impregnated in an element having a separator disposed between a positive electrode and a negative electrode, each being a carbonaceous electrode, wherein
    the separator comprises a plurality of sheets,
    at least one of the plurality of sheets is a first cellulose paper having a thickness of from 20 to 60 μm and a density of from 0.30 to 0.55 g/cm$^3$, and
    the first cellulose paper is sheeted to contain at least 50 wt % of fibers obtained by beating regenerated cellulose fibers.

2. The electric double layer capacitor according to claim 1, wherein each of the plurality of sheets comprises cellulose.

3. The electric double layer capacitor according to claim 1, wherein
    at least one of the plurality of sheets is a second cellulose paper having a thickness of from 10 to 35 μm and a density of from 0.56 to 0.70 g/cm$^3$, and
    the second cellulose paper is thinner than the first cellulose paper.

4. The electric double layer capacitor according to claim 3, wherein the first cellulose paper and the second cellulose paper are overlaid one on the other.

5. The electric double layer capacitor according to claim 1, wherein the separator comprises two sheets of the first cellulose paper overlaid one on the other.

6. The electric double layer capacitor according to claim 1, wherein the first cellulose paper has a porosity of from 60 to 90%.

7. The electric double layer capacitor according to claim 1, wherein the separator has a thickness of from 40 to 120 μm.

8. The electric double layer capacitor according to claim 1, wherein each of the carbonaceous electrodes comprises a carbon material having a specific surface area of from 700 to 2,500 m$^2$/g and an organic binder.

9. The electric double layer capacitor according to claim 1, wherein a solute of the non-aqueous electrolyte is a salt comprising a quaternary onium cation of the formula $R^1R^2R^3R^4N^+$ or $R^1R^2R^3R^4P^+$, wherein each of $R^1$, $R^2$, $R^3$ and $R^4$ which are independent of one another, is a $C_{1-6}$ alkyl group, and an anion of the formula $BF_4^-$, $PF_5^-$, $CF_3SO_3^-$, $AsF_6^-$, $N(SO_2CF_3)_2^-$ or $ClO_4^-$.

10. The electric double layer capacitor according to claim 1, wherein a solvent of the non-aqueous electrolyte is at least one member selected from the group consisting of propylene carbonate, ethylene carbonate, dimethyl carbonate, diethyl carbonate, methylethyl carbonate, acetonitrile, sulfolane and methylsulfolane.

11. The electric double layer capacitor according to claim 1, wherein the separator is preliminarily heat-treated at a temperature of from 90 to 250° C. and then disposed between the positive electrode and the negative electrode.

12. The electric double layer capacitor according to claim 1, wherein the fibers have a Canadian standard freeness of from 0 to 600 ml.

13. A method of making a capacitor, the method comprising disposing a separator comprising cellulose paper between a positive electrode and a negative electrode, and forming an electric double layer capacitor having a non-aqueous electrolyte impregnated in an element having the separator disposed between the positive electrode and the negative electrode, each being a carbonaceous electrode, wherein the separator comprises a plurality of sheets, at least one of the plurality of sheets is a first cellulose paper having a thickness of from 20 to 60 μm and a density of from 0.30 to 0.55 g/cm$^3$, and the first cellulose paper is sheeted to contain at least 50 wt % of fibers obtained by beating regenerated cellulose fibers.

* * * * *